(12) United States Patent
Kanno et al.

(10) Patent No.: US 6,721,494 B1
(45) Date of Patent: Apr. 13, 2004

(54) DATA RECORDING METHOD AND APPARATUS AND DATA REPRODUCING METHOD AND APPARATUS

(75) Inventors: Hiroshi Kanno, Kanagawa (JP); Nobuhiro Hayashi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/527,853

(22) Filed: Mar. 17, 2000

(30) Foreign Application Priority Data

Mar. 24, 1999  (JP) .......................... 11-080394

(51) Int. Cl.⁷ .................. H04N 5/781; H04N 7/64
(52) U.S. Cl. ................. 386/124; 386/125; 386/113
(58) Field of Search ..................... 386/124, 125, 386/126, 45, 109, 111, 112, 105, 106, 113, 114, 21, 46, 1, 27, 33, 40; H04N 5/781, 7/64

(56) References Cited

U.S. PATENT DOCUMENTS 6,246,650 B1 * 6/2001 Kuroiwa

FOREIGN PATENT DOCUMENTS

JP  363121933 A  * 5/1988
JP  40436873 A  * 12/1992

* cited by examiner

*Primary Examiner*—Robert Chevalier
(74) *Attorney, Agent, or Firm*—Rader, Fishman & Grauer PLLC; Ronald P. Kananen

(57) ABSTRACT

A data recording and/or reproducing apparatus in which, for recording and/or reproducing data required to be real-time data, such as compressed moving picture data, error occurrence is suppressed efficiently as the real-time performance are maintained to improve data reliability. If a writing error is caused when recording data of an AV data stream on a magnetic disc 5, the state of the buffer memory 36 at the time point of occurrence of the writing error is monitored. Depending on the state of the buffer memory 36, switching is made between performing and not performing a retry operation of re-recording data corrupted with a writing error.

36 Claims, 5 Drawing Sheets

| REGISTER | 7 | 6 | 5 | 4 | 3 | 2 | 1 | 0 |
|---|---|---|---|---|---|---|---|---|
| FEATURES | DATA ATTRIBUTE ||||||||
| SECTOR COUNT | WRITING SECTORS ||||||||
| SECTOR NUMBER | WRITING START LOGIC BLOCK ADDRESS ||||||||
| CYLINDER LOW |  ||||||||
| CYLINDER HIGH |  ||||||||
| DEVICE/HEAD |  |  |  |  |  |  |  |  |
| COMMAND | 87h ||||||||

| REGISTER | 7 | 6 | 5 | 4 | 3 | 2 | 1 | 0 |
|---|---|---|---|---|---|---|---|---|
| FEATURES | DATA ATTRIBUTE ||||||||
| SECTOR COUNT | WRITING SECTORS ||||||||
| SECTOR NUMBER | WRITING START LOGIC BLOCK ADDRESS ||||||||
| CYLINDER LOW |  ||||||||
| CYLINDER HIGH |  ||||||||
| DEVICE/HEAD |  |  |  |  |  |   |||
| COMMAND | 86h ||||||||

FIG.5

DATA RECORDING METHOD AND APPARATUS AND DATA REPRODUCING METHOD AND APPARATUS

BACKGROUND OF THE INVENTION

1. Field of the Invention

This invention relates to a data recording method and apparatus for recording digital data on a recording medium, such as a magnetic disc, and to a data reproducing method and apparatus for reproducing digital data from the recording medium.

2. Description of Prior Art

Recently, a hard disc drive, in which a magnetic disc, comprised of a metal substrate of e.g., aluminum, having its surface ground smooth, is used as a recording medium, and in which a floating slider, carrying a magnetic head, is floated over a data recording area of the magnetic disc to write or reproduce data, is in widespread use.

The hard disc drive has an extremely high data recording density and is able to store a large quantity of data. Moreover, data recorded thereon can be accessed at an extremely high speed. For this reason, the hard disc drive is widely used as a storage device for storing data processed by a computer.

FIG. 1 shows an illustrative structure of a signal processing circuit in the hard disc drive.

When digital data processed by a data processing device, such as a host computer, referred to below as recording data, is to be recorded on a magnetic disc by a hard disc drive 100, shown in FIG. 1, a recording command first is routed from a data processing device, such as a host computer, to a central processing unit (CPU) 101, whilst the recording data is routed to a host interface 103 in a hard disc controller 102. The recording data, routed to the host interface 103, is temporarily stored in a buffer memory 105, under control by a bus controller 104.

The CPU 101 instructs to a sequencer 106 in which sector on the magnetic disc the recording data is to be recorded, under a recording command routed from the data processing device, such as a host computer.

The magnetic head is positioned on the magnetic disc by a servo control circuit 107 computing the current magnetic head position, based on the position information detected by the magnetic head, and by the driving current of a voice coil motor (VCM) being controlled responsive to the current position of the magnetic head.

If the sequencer 106 has verified that the magnetic head is at the targeted position, it reads out recording data from the buffer memory 105 to route the recording data to an error correcting circuit (ECC) 108. The recording data, routed to the ECC circuit 108, is added to with an error correction code, and is subsequently transferred through a disc interface 109 to a channel IC 110. The channel IC 110 channel-encodes the recording data, transferred thereto over a disc interface 109, to convert the data to binary-valued signals. These signals are written by the magnetic head as magnetization inversion pattern. The operating timing of the disc interface 109 is controlled by the sequencer 106.

If, when the recording data is recorded on the magnetic disc, the servo control circuit 107 detects that, due to an excessively large position signal from the magnetic head, it is difficult to continue the regular operation, the sequencer 106 transfers to a retry mode to perform the operation of re-recording the same sector. The information indicating the difficulty in continuing the regular operation may be routed from the servo control circuit 107 directly to the sequencer 106 or may be routed through the CPU 101 to the sequencer 106.

For reproducing data recorded on the magnetic disc by the hard disc drive 100, a playback command first is routed from a data processing device, such as a host computer, to the CPU 101. The magnetic head then reads out the magnetization inversion pattern from the magnetic disc.

The magnetic head is positioned on the magnetic disc, by the servo control circuit 107 computing the current position of the magnetic head, based on the position information detected by the magnetic head, and by the VCM driving current being controlled responsive to the current position of the magnetic head.

The magnetization inversion pattern, read out for the magnetic disc by the magnetic head, is restored to digital data, referred to below as playback data, by the channel IC 110 performing the operations of waveform equalization, signal detection or channel code decoding. Although the playback data may be corrupted with errors, it is directly transferred to the disc interface 109 in-the hard disc controller 102.

The operational timing of the disc interface 109 is controlled by the sequencer 106. If the sequencer 106 has confirmed that the magnetic head is at a target position, the sequencer retrieves playback data from the channel IC 110, over the disc interface 109, to route the playback data to the ECC communication 108.

The ECC circuit 108 decodes the error correction code appended to the playback data to execute error correction and detection. If an 8-symbol error correction code is appended to the playback data, the ECC circuit 108 is able to correct the error of the playback data up to the fourth symbol. However, if the number of symbols to be corrected is larger, the error correction is time-consuming thus lowering the processing speed. Therefore, in the above case, error correction up to the second symbol is made without exploiting the correction capability of the ECC circuit 108 to a maximum extent. If an error is found to be present in the as-corrected playback data, the sequencer 106 transfers to a retry mode to re-reproduce the same sector. In this case, the correction capability of the ECC circuit 108 is exploited to its maximum extent to correct the playback data for errors.

The hard disc drive is configured to execute decoding usually at a high speed and to raise the retry and correction capability only at the time of error occurrence to expedite the overall processing speed such as to maintain data reliability.

The playback data, processed by the ECC circuit 108 with error correction and detection, is temporarily stored in the buffer memory 105, under control by the bus controller 104. The playback data, stored in the buffer memory 105, is sequentially transferred over the host interface 103 to a data processing device, such as a host computer.

Meanwhile, in keeping pace with the recent progress in the digital technique, digitized moving picture data is routinely processed on a computer. For providing means for storing moving picture data, thus processed on the computer, a demand has been raised for using a hard disc drive.

For recording and/or reproducing the moving picture data, a data stream making up the moving picture is desirably recorded and/or reproduced in real-time. Therefore, if the moving picture data is to be reproduced using the above-described hard disc drive 100, it is necessary to sequentially transfer the playback data transiently stored in the buffer memory 105 from the buffer memory 105 to the data processing device, such as a host computer. The result is that, if an error is found to persist in the as-corrected playback data, and the retry operation is repeatedly performed until the error ceases to be detected, it may be an occurrence that the buffer memory 105 becomes void to stop the reproducing operation.

If, in order to evade this inconvenience, moving picture data is to be reproduced, using the hard disc drive 100, the processing of directly transferring the playback data corrupted with errors to the data processing device, such as a host computer, is occasionally performed without performing the retry operation suffering from temporal indefinite elements. However, in such case, the reproduced moving picture data is deteriorated inevitably in picture quality.

On the other hand, if the moving picture data is recorded using the aforementioned hard disc drive 100, recording data is sequentially transferred from the data processing device, such as a host computer, to the hard disc drive 100, for storage in the buffer memory 105. Thus, if a writing error is produced, but the retry operation is repeatedly performed until a writing error ceases to be produced, there is a risk that the buffer memory 105 undergoes overflowing to halt the recording operation.

In order to evade such inconvenience in recording moving picture data with the hard disc drive 100, data corrupted with a writing error may sometimes be directly discarded without performing the retry operation suffering from temporal indefinite elements. However, in such case, the lacking moving picture data is not reproduced, so that, if pre-set moving picture data is reproduced, the reproduced moving picture data is necessarily deteriorated in picture quality.

SUMMARY OF THE INVENTION

It is therefore an object of the present invention to provide a data recording method and apparatus in which moving picture data, required to be handled in real-time, may be recorded so that data with as high data quality as possible will be reproduced on reproduction, as the real-time performance is maintained, by efficiently utilizing data storage means, such as buffer memories.

It is an object of the present invention to provide a data reproducing method and apparatus in which moving picture data, in particular moving picture data, required to be real-time data, can be reproduced as data with as high data quality as possible, as the real-time performance is maintained.

In one aspect, the present invention provides a data recording apparatus for recording compressed moving picture data on a recording medium, including data storage means for transiently storing moving picture data to be written in the recording medium, retry means for re-writing data corrupted with a writing error on the recording medium if such writing error has been produced during the recording operation, and switching means for switching the operation of the retry means depending on the state of the data storage means at the time of production of the writing error.

In this data recording apparatus, the moving picture data written on the recording medium are sequentially stored for the time being in data storage means, herein buffer storage means. It is noted that picture data making up the moving picture data, read out from the data storage means, is sequentially recorded on the recording medium.

If, in sequentially recording the moving picture data, read out from the data storage means, a writing error is produced, switching means switches between performing and not performing the retry operation of re-writing data corrupted with the writing error on the recording medium depending on the state of writing error occurrence of the data storage means.

In more detail, if the free space of the data storage means on writing error occurrence exceeds a data volume stored in the data storage means during the time moving picture data of the data volume written at a time in the data storage means is written on the recording medium, the retry means is operated to re-write the data corrupted with the writing error on the recording medium. If conversely the free space of the data storage means on writing error occurrence is lesser than a data volume stored in the data storage means during the time moving the picture data of the data volume written at a time in the data storage means is written on the recording medium, the retry means is not operated.

In the present data recording apparatus, the switching means switches between operating and not operating the data storage means depending on the state of the data storage means at the time of occurrence of the writing error. For example, if there is sufficient free space in the data storage means at the time of occurrence of the writing error, the retry means is operated to improve the data quality, whereas, if there is no sufficient free space in the data storage means at the time of occurrence of the writing error, the retry means is not operated to assure the real-time performance. Thus, it is possible to record moving picture data, required to be real-time data, so that data of the highest possible data quality will be reproduced as real-time data.

In another aspect, the present invention provides a data recording apparatus for recording digital data on a recording medium including discriminating means for discriminating whether the digital data is compressed moving picture data or other data, data storage means for transiently storing the digital data written on the recording medium, retry means for rewriting data corrupted with a writing error produced during the recording operation on the recording medium and switching means for switching between operating and not operating the retry means, responsive to the state of the data storage means at the time of occurrence of the writing error, if the discriminating means verifies the digital data to be the compressed moving picture data.

In this data recording apparatus, the digital data written on the recording medium is transiently stored in the data storage means. The digital data read out from the data storage means is sequentially recorded on the recording medium. It is up to the discriminating means to verify whether the digital data recorded on the recording medium is compressed moving picture data or other data.

If, in this data recording apparatus, the digital data to be recorded is verified by the discriminating means to be compressed moving picture data, the switching means switches between operating and not-operating the retry means performing the rewriting of the data corrupted with the writing error on the recording medium, depending on the state of the data storage means prevailing at the time of occurrence of a writing error, in case the writing error has occurred during recording of the digital data read out from the data storage means sequentially on the recording medium.

In the present data recording method, in which, in recording the compressed moving picture data on the recording medium, switching between performing and not performing the retry operation is made depending on the state of the data storage means prevailing at the time of generation of the writing error. Thus, in recording moving picture data, required to be real-time data, the picture can be recorded so that moving picture data with as high a data quality as possible will be reproduced as real-time data.

In still another aspect, the present invention provides a data recording method wherein, in recording compressed data on a recording medium, switching is made between performing and not performing a retry operation of re-writing data corrupted with a writing error produced during the recording operation depending on the state of data storage means transiently storing the moving picture data written on the recording medium at the time of occurrence of the writing error.

In the present data recording method, switching is made between performing and not performing the retry operation of re-writing data corrupted with a writing error on the recording medium depending on the state of the data storage means prevailing at the time of the occurrence of the writing error. In more detail, if the free space of the data storage means at the time of occurrence of the writing error exceeds the amount of data stored in the recording medium during the time picture data of a data volume written at a time on the recording medium is written on the recording medium, the retry operation is performed, whereas, if the free space of the data storage means at the time of occurrence of the writing error is lesser than the amount of data stored in the recording medium during the time picture data of a data volume written at a time on the recording medium is written on the recording medium, the retry operation is performed.

In the present data recording method, switching is made between performing and not performing the retry operation depending on the state of the data storage means prevailing at the time of error occurrence of the writing error, so that, if there is sufficient free space in the data storage means at the time of occurrence of the writing error, the retry operation is performed to improve the data quality, whereas, if if there is not sufficient free space in the data storage means at the time of occurrence of the writing error, the retry operation is not performed to assure the real-time performance. Thus, it is possible to record moving picture data, required to be real-time data, so that data with as high a quality as possible will be reproduced as real-time data.

In still another aspect, the present invention provides a data recording method for recording digital data on a recording medium including discriminating whether the digital data is compressed moving picture data or other data, wherein, if the digital data is verified to be compressed moving picture data, switching is made between performing and not performing a retry operation depending on the state at the time of error occurrence of a writing error of data storage means transiently storing the digital data to be written on the recording medium, in case the writing error has occurred during the recording operation, the retry operation being the operation of re-writing data corrupted with the writing error on the recording medium.

If, in this data recording method, the digital data to be recorded is verified to be compressed moving picture data, switching between performing and not performing the retry operation of re-writing data corrupted with the writing error is made depending on the state of the data storage means prevailing at the time of error occurrence of the writing error.

In the present data-recording method, if the digital data to be recorded is verified to be compressed moving picture data, switching between performing and not performing the retry operation depends on the state of the data storage means prevailing at the time of error occurrence of the writing error. Thus, it is possible to record moving picture data, required to be real-time data, so that data with as high a quality as possible will be reproduced as real-time data.

In still another aspect, the present invention provides a data reproducing apparatus for reproducing compressed moving picture data from a recording medium including data storage means for transiently storing moving picture data read out from the recording medium, retry means for re-reading from the recording medium data corrupted with an error produced in the moving picture data read out from the recording medium and switching means for switching the operation of the retry means responsive to the state of the data storage means prevailing at the time of error occurrence of the error in the moving picture data read out from the recording medium.

In this data reproducing apparatus, the moving picture data, read out from the recording medium, is transiently stored in the data storage means. If an error has occurred in the moving picture data read out from the recording medium, the switching means switches between performing and not performing the retry operation of re-reading out error-corrupted data from the recording medium depending on the state of the data storage means prevailing when the error has occurred in the moving picture data read out from the recording medium.

In more detail, the switching means switches the operation of the retry means so that, if the amount of data stored in the data storage means when an error has occurred in the moving picture data read out from the recording medium exceeds the amount of data transferred from the data storage means during the time the moving picture data of a data quantity read out at a time from the recording medium is read out from the recording medium, the retry means is operated to re-read the error-corrupted data from the recording medium, whereas, if the amount of data stored in the data storage means when an error has occurred in the moving picture data read out from the recording medium is lesser than the amount of data transferred from the data storage means during the time the moving picture data of a data quantity read out at a time from the recording medium is read out from the recording medium, the retry means is not operated.

That is, in the present data reproducing apparatus, the switching means switches the operation of the retry means, depending on the state of the data storage means prevailing when the error has occurred in the picture data read out from the recording medium, so that, if a sufficient amount of moving picture data has been stored on the recording medium when an error has occurred in the moving picture data read out from the recording medium, the retry means is operated to improve the data quality. If no sufficient amount of moving picture data has been stored on the recording medium when an error has occurred in the moving picture data read out from the recording medium, the retry means is operated to assure real-time performance. Thus, the moving picture data, required to be real-time data, can be reproduced as high-quality real-time data.

In still another aspect, the present invention provides a data reproducing apparatus for reproducing digital data from a recording medium including discriminating means for discriminating whether the digital data is compressed moving picture data or other data, data storage means for transiently storing the digital data read out from the recording medium, retry means for re-reading from the recording medium data corrupted with errors produced in the digital data read out from the recording medium and changeover means for switching the operation of the retry means, depending on the state of the data storage means at the time of error occurrence in the digital data read out from the recording medium if the digital data has been verified to be compressed moving picture data by the discriminating means.

In this data reproducing apparatus, the digital data read out from the recording medium is transiently stored in the data storage means. It is up to the discriminating means to verify whether the digital data is the compressed moving picture data or other data.

If, in the present data reproducing apparatus, the digital data has been verified by the discriminating means to be compressed moving picture data, and an error has occurred in the digital data read out from the recording medium, the switching means switches between performing and not performing the retry means of re-writing the error-corrupted data on the recording medium depending on the state of the data storage means prevailing as the error has been produced.

In the present data reproducing apparatus, the switching means switches between operating and not operating the retry means depending on the state of the data storage means when the error has occurred in the moving picture data read out from the recording medium, so that, in recording predetermined moving picture data required to be real-time data, the moving picture data can be reproduced as high-quality real-time data.

In still another aspect, the present invention provides a data reproducing method for reproducing compressed data from a recording medium, wherein switching is made between performing and not-performing the retry operation of re-reading from the recording medium the error-corrupted moving picture data at the time of error occurrence depending on the state at the time of error occurrence in the moving picture data read out from the recording medium of data storage means transiently storing moving picture data read out from the recording medium.

In this data reproducing apparatus, switching is made between performing and not performing the retry operation of re-reading the moving picture data corrupted with errors from the recording medium, when such error has been produced in the moving picture, depending on the state of the data storage means when the error has been produced. In more detail, if the data volume of data stored in the data storage means when an error is produced in the moving picture data read out from the recording medium exceeds the data volume of data transferred from the data storage means during the time the moving picture data of a data volume read out at a time from the recording medium is read out from the recording medium, the retry operation is performed to re-read the error-corrupted data from the recording medium, whereas, if the data volume of data stored in the data storage means when an error is produced in the moving picture data read out from the recording medium is less than the data volume of data transferred from the data storage means during the time the moving picture data of a data volume read out at a time from the recording medium is read out from the recording medium, the retry operation is not performed.

In the present data reproducing method, in which switching between performing and not performing the retry operation is made depending on the state of the data storage means prevailing when the error is produced in the moving picture data read out from the recording medium, such that, if a sufficient amount of picture data is stored in the data storage means when an error is produced in the moving picture data read out from the recording medium, the retry operation is performed to improve the data quality, whereas, if no sufficient amount of picture data is stored in the data storage means when an error is produced in the moving picture data read out from the recording medium, the retry operation is not performed to assure the real-time performance. Thus, it is possible to reproduce moving picture data, required to be real-time data, as high-quality real-time data.

In yet another aspect, the present invention provides a data reproducing method for reproducing digital data from a recording medium wherein the digital data is discriminated as to whether it is compressed moving picture data or other data, and wherein, if the digital data is verified to be compressed moving picture data, switching is made between performing and not performing the retry operation of re-reading from the recording medium error-corrupted moving picture data, if an error is produced in the moving picture data read out from the recording medium, depending on the state at the time of error occurrence in the moving picture data read out from the recording medium of data storage means transiently storing moving picture data read out from the recording medium.

With this data reproducing method, if the digital data to be reproduced is verified to be compressed moving picture data, the retry operation is or is not performed depending on the state of the data storage means prevailing when the error has been produced in the moving picture data read out from the recording medium, so that, if moving picture data, required to be real-time data, is to be reproduced, it can be reproduced as high-quality real-time data.

In a data recording apparatus according to the present invention, in which the retry operation of re-writing data corrupted with a writing error on the recording medium when such writing error is produced during the recording operation is or is not performed in a switching fashion depending on the state of the data storage means prevailing when the writing error has been produced, the moving picture data, required to be real-time data, can be optimally recorded as real-time data such as to suppress error occurrence during reproduction efficiently.

In another data recording apparatus according to the present invention, it is verified whether digital data to be recorded on a recording medium is compressed moving picture data required to be real time data, or other data, when the digital data is recorded on the recording medium. If this digital data is verified to be compressed moving picture data, the retry operation of rewriting data corrupted with the writing error is or is not performed, depending on the state of the data storage means prevailing when the writing error has occurred. Thus, the moving picture data, required to be real-time data, can be recorded as optimum real-time data, such as to exploit the data storage means efficiently and to suppress error occurrence on reproduction efficiently.

If, in the present data recording apparatus, the digital data to be recorded is data other than the compressed moving picture data, and the writing error is produced during recording, the retry operation can be repeatedly performed to write the data corrupted with the writing error a number of times until the writing error ceases to be produced, whereby the error occurrence on reproduction can be suppressed effectively to improve data reliability.

In a data recording method according to the present invention, the retry operation of re-writing data corrupted with a writing error when such writing error is produced during recording is or is not performed, depending on the state of the data storage means prevailing when the writing error has been produced. Thus, the moving picture data, required to be real-time data, can be recorded as optimum real-time data, such as to exploit the data storage means efficiently and to suppress error occurrence on reproduction efficiently.

In another data recording method according to the present invention, it is verified whether digital data recorded on a recording medium is compressed moving picture data required to be real time data, or other data, when the digital data is recorded on the recording medium. If the digital data is verified to be compressed moving picture data, the retry operation of re-writing data corrupted with a writing error is or is not performed, depending on the state of the data storage means prevailing when the writing error has occurred. Thus, the moving picture data, required to be real-time data, can be recorded as optimum real-time data, such as to exploit the data storage means efficiently and to suppress error occurrence on reproduction efficiently.

If, in the present data recording method, the digital data to be recorded is verified to be data other than the compressed moving picture data, and the writing error has been produced during recording, the retry operation can be repeatedly performed to write the data corrupted with the writing error a number of times until the writing error ceases to be produced, whereby the error occurrence on reproduction can be suppressed effectively to improve data reliability.

If, in a data reproducing apparatus according to the present invention, an error is produced in the data read out from the recording medium, the retry operation of re-reading error-corrupted data from the recording medium at the time of occurrence of an error in data read out from the recording medium is or is not performed depending on the state of the data storage means prevailing when the error is produced. Thus, the moving picture data, required to be real-time data, can be reproduced as real-time data such as to exploit the data storage means efficiently and to suppress error occurrence efficiently.

In another data reproducing apparatus according to the present invention, it is verified, in reproducing digital data from a recording medium, whether the digital data is compressed moving picture data required to be real-time data, or other data. If this digital data is verified to be compressed moving picture data, and an error is produced in the data read out from the recording medium, the retry operation of re-reading error-corrupted data from the recording medium is or is not performed, in a switching fashion, depending on the state of the data storage means prevailing when the error has occurred. Thus, the moving picture data, required to be real-time data, can be reproduced as real-time data such as to exploit the data storage means efficiently and to suppress error occurrence effectively.

Also, if, in the present data reproducing apparatus, the digital data to be recorded is verified to be data other than the compressed moving picture data, and an error is produced in the data read out from the recording medium, it is possible to perform the retry operation repeatedly to read out the error-corrupted data from the recording medium a number of times until the error ceases to be produced, thereby improving data reliability appreciably.

In a data reproducing method according to the present invention, if an error is produced in the data read out from the recording medium, the retry operation of re-reading the error-corrupted data from the recording medium is or is not performed, in a switching fashion, depending on the state of the data storage means prevailing when an error has been produced. Thus, the moving picture data, required to be real-time data, can be reproduced as real-time data, as the error occurrence is suppressed to improve reliability of the reproduced data.

If, in another data reproduced method according to the preset invention, digital data is to be reproduced from the recording medium, it is verified whether the digital data is compressed moving picture data required to be real-time data or other data. If the digital data is verified to be compressed moving picture data, and an error is produced in the data read out from the digital data, the retry operation of re-reading out the error-corrupted data from the recording medium is or is not performed, in a switching fashion, depending on the state of the datastorage means prevailing when the error has been produced. Thus, moving picture data, required to be real-time data, can be reproduced as real-time data, whereby reproduced data can be improved in reliability as error occurrence is suppressed efficiently.

If, in the data reproducing method, the digital data to be reproduced is verified to be data other than the compressed picture data, and an error is produced in the data read out from the recording medium, the retry operation can be repeatedly performed to read out error-corrupted data repeatedly until the error ceases to be produced, whereby error occurrence can be suppressed effectively to improve data reliability.

BRIEF DESCRIPTION OF THE DRAWINGS

FIG. 5 shows a typical reproducing command used in the data recording and/or reproducing apparatus.

DESCRIPTION OF THE PREFERRED EMBODIMENTS

Figure 1:
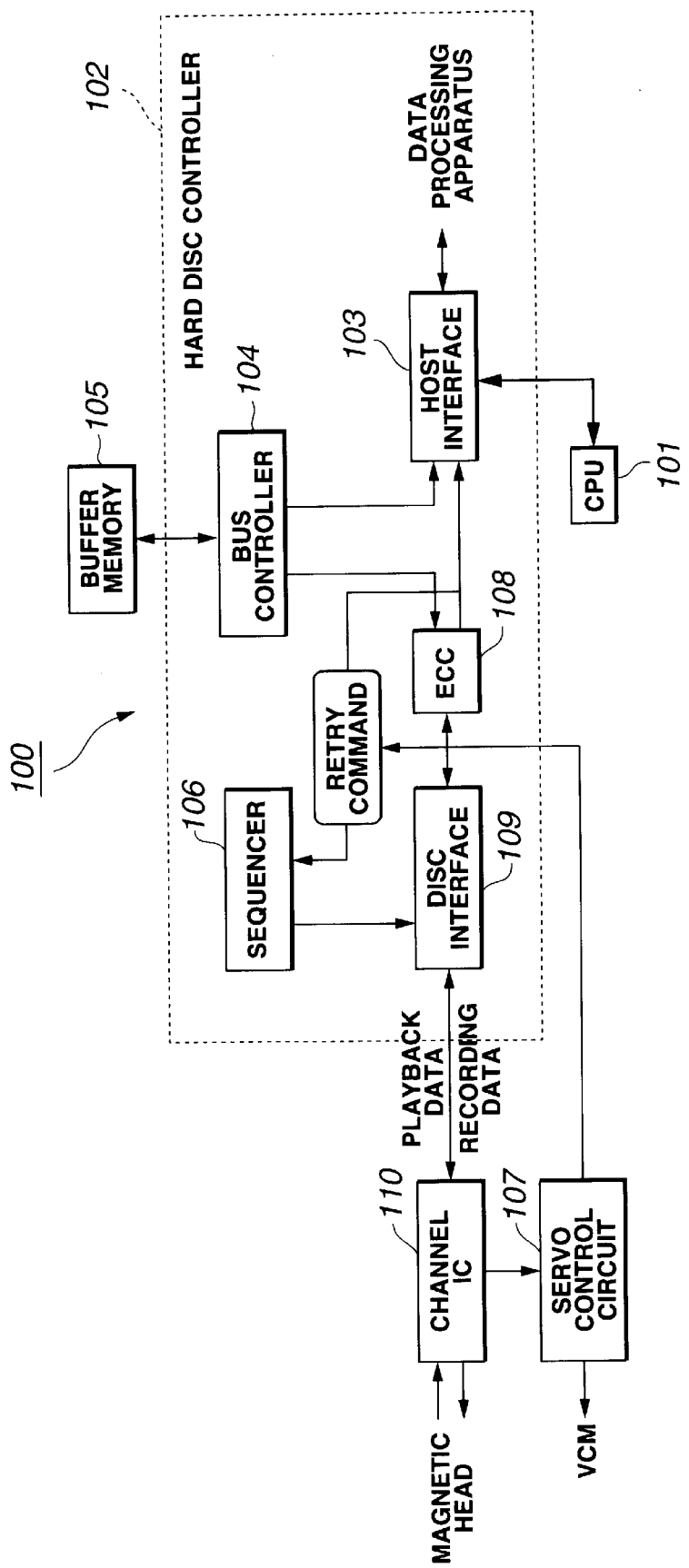
FIG. 1 is a block diagram showing an illustrative structure of a conventional hard disc drive.

Referring to the drawings, preferred embodiments of a data recording and/or reproducing apparatus according to the present invention will be explained in detail. In the following description, the data recording and/or reproducing apparatus is assumed to be a fixed hard disc drive provided at the outset in the main body portion of the apparatus. The present invention is, however, not limited to this specified configuration since the magnetic disc may also be an external storage device, such as a removable hard disc drive mounted removably with respect to the main body portion of the apparatus, or an optical disc.

Figure 2:
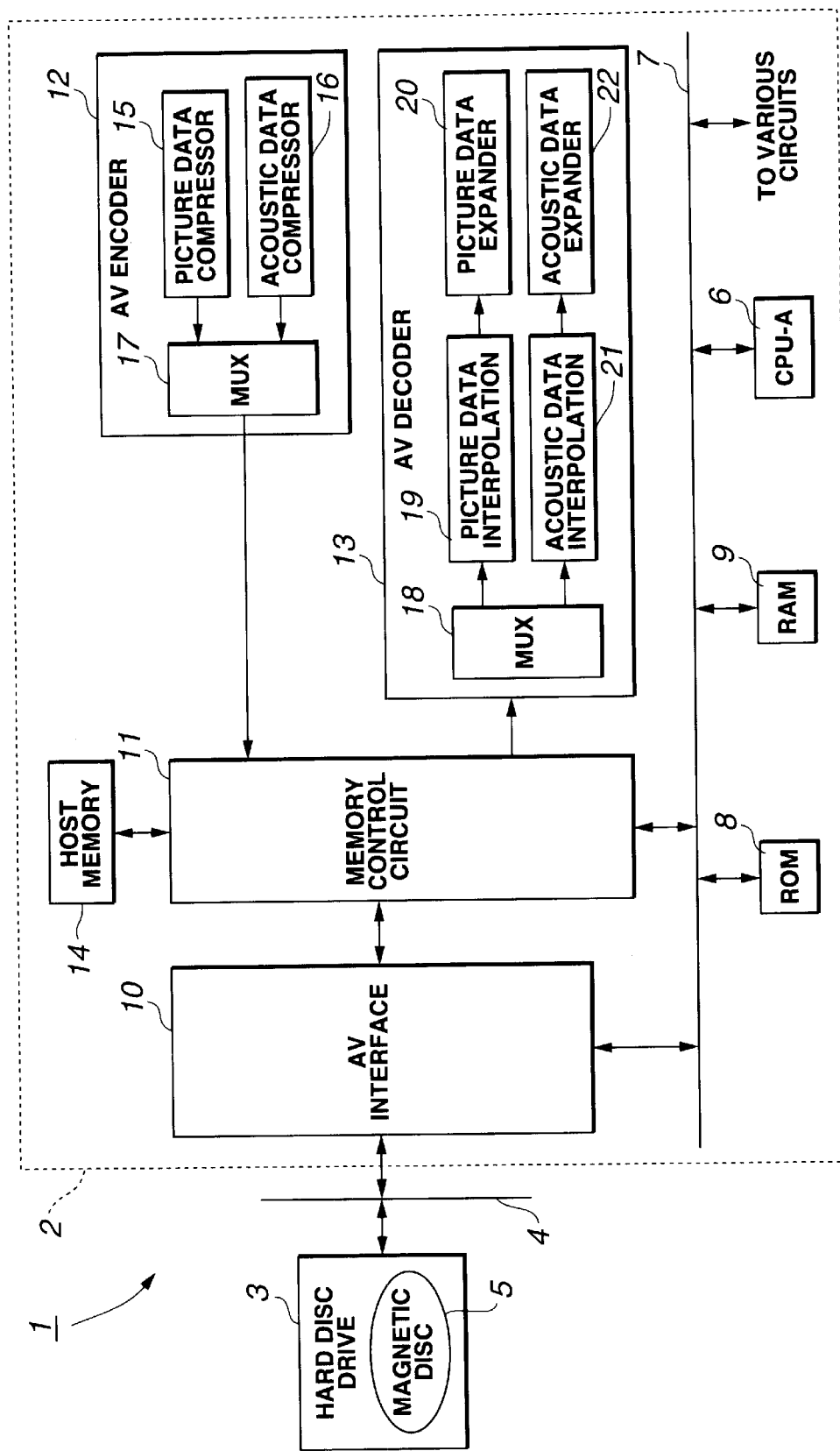
FIG. 2 is a block diagram showing an illustrative structure of a data recording and/or reproducing apparatus embodying the present invention and specifically showing details of the inside of the data processing device.

FIG. 2 shows an illustrative structure of a data recording and/or reproducing apparatus 1 embodying the present invention. The data recording and/or reproducing apparatus 1, shown in FIG. 2, is comprised of a host-side data processing device 2 and a hard disc drive 3, as an external storage device, interconnected over a host interface bus 4. The digital moving picture data and the digital audio data, processed in the data processing device 2, are recorded on a magnetic disc 5 in the hard disc drive 3, or the digital moving picture data and digital audio data, recorded on the magnetic disc 5 in the hard disc drive 3, are reproduced. As the host interface, an extended IDE standard (ATA standard) is used.

The overall operation of the data recording and/or reproducing apparatus 1 is supervised by a CPU-A 6 in the data processing device 2. In this CPU-A 6, a ROM 8 and a RAM 9 are interconnected over a CPU-A bus 7. The firmware by which the CPU-A 6 supervises the entire operation of the data recording and/or reproducing apparatus 1 is stored in the ROM 8. The RAM 9 is used as a working area for the CPU-A 6.

The data recording and/or reproducing apparatus 1 is also provided with a switch, a remote controller, a keyboard and a liquid crystal display device, not shown, as a user interfacing mechanism. Inputs from or outputs to the user interfacing mechanism are supervised by the CPU-A 6.

On the other hand, the CPU-A 6 is connected over the CPU-A bus 7 to an AV interface 10. In this data recording and/or reproducing apparatus 1, commands for writing data in the magnetic disc 5 by the hard disc drive 3 or commands for reading out data from the magnetic disc by the hard disc drive 3 are given by issuing a recording command or a reproducing command defined in the extended IDE standard from the AV interface 10 to the hard disc drive 3.

The CPU-A 6 also is connected over the CPU-A bus 7 to a memory control circuit 11. This memory control circuit 11 is connected to an AV encoder 12 configured for compressing and multiplexing input picture signals or audio signals to output the resulting signals as an AV data stream, and to an AV decoder 13 configured for separating the AV data stream read out from the magnetic disc 5 by the hard disc drive 3 into picture and audio data and for interpolating and expanding the picture and audio data to output the data as routine picture and acoustic signals. To the memory control circuit 11 is connected a host memory 14 for temporarily storing data supplied to the hard disc drive 3 or data supplied from the hard disc drive 3.

Figures 3, 4:
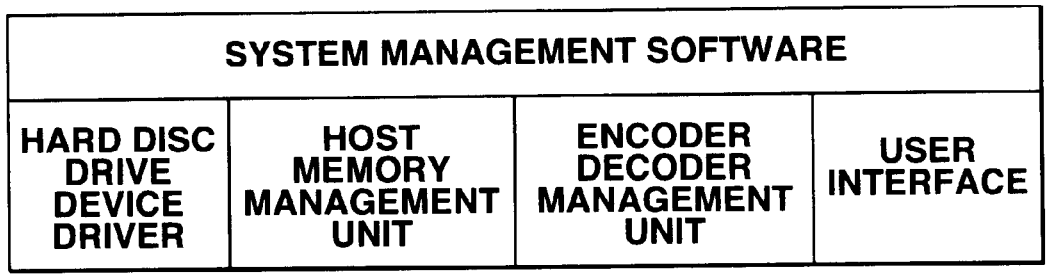
FIG. 3 shows the structure of a firmware of the data processing device.
FIG. 4 shows a typical recording command used in the data recording and/or reproducing apparatus.

FIG. 3 shows the hierarchical structure of the firmware stored in the ROM 8 so as to be executed by the CPU-A 6. Referring to FIG. 3, the first lower layer of the firmware is made up of a user interfacing unit for inputting/outputting for the user interfacing mechanism, an encoder/decoder supervising unit for controlling the operation of the AV encoder 12 and the AV decoder 13, a host memory supervising unit for controlling the data write and readout operation for the host memory 14 by the memory control circuit 11 and a hard disc drive device controller for operating each device provided on the hard disc drive 3.

The upper second layer of the firmware is constructed by a system management software supervising each component of the lower first layer and the operation of the data recording and/or reproducing apparatus 1 in its entirety. The functions of the system management software encompass the functions which are required for the data recording and/or reproducing apparatus 1, inclusive of commands and management of the recording and reproducing operations of the respective channels and control as well as management of the operating states of the hardware resources, such as hard disc drive 3 or host memory 14, and which are not included in the lower first layer.

The processing flow for recording data on the magnetic disc 5 of the hard disc drive 3 by the above-described data recording and/or reproducing apparatus 1 is hereinafter explained. When recording data by this data recording and/or reproducing apparatus 1 on the magnetic disc 5 of the hard disc drive 3, analog picture signals (analog video signals) and analog audio signals, such as NTSC signals, are converted by an A/D converter, not shown, into respective digital data, which then are inputted to the AV encoder 12.

The digital moving picture data (digital video data), inputted to the AV encoder 12, are compressed by a moving picture data compression unit 15 in the AV encoder 12 by a factor of, for example, five. The digital audio data, inputted to the AV encoder 12, are compressed by an audio data compression unit 16 in the AV encoder 12. Among data compression systems, currently used, there are a DV encoding system and a MPEG encoding system. These data compression systems compress the data rate by performing DCT, inter-frame motion detection, re-quantization and two-dimensional Huffman encoding.

The digital moving picture data (moving picture data), compressed by the moving picture data compression unit 15, and the digital audio data, compressed by the audio data compression unit 16, are multiplexed by a MUX 17 to an AV data stream.

This AV data stream is sequentially written via the memory control circuit 11 in the host memory 14 for the time being. When the CPU-A 6 issues a command to the memory control circuit 11 under control by the host memory supervising unit of the firmware, data making up the AV data stream is sequentially read out from the host memory 14.

The data sequentially read out from the host memory 14 is sent via AV interface 10 to outside the data processing device 2 and routed over the host interface bus 4 to the hard disc drive 3. When the data is routed to the hard disc drive 3, error correction codes are appended to the data in the hard disc drive 3. The resulting data is sequentially recorded on the magnetic disc 5, with one-track data of the magnetic disc 5 as a writing unit.

If, when the data making up the AV data stream is recorded on the magnetic disc 5 in the data recording and/or reproducing apparatus 1 embodying the present invention, it is found to be difficult to continue the regular operation due to, for example, an excessively large head position signal (writing error), the operation of monitoring the state of the buffer memory used for transiently storing data supplied to the hard disc drive 3 and re-recording the data corrupted with the writing error on the magnetic disc 5 responsive to the state of the buffer memory (retry operation) is switched to make efficient use of the buffer memory to achieve the real-time performance and improved data quality simultaneously. This switching of the retry operation will be explained subsequently.

The processing flow of reproducing data recorded on the magnetic disc 5 of the hard disc drive 3 by the data recording and/or reproducing apparatus 1 is explained. For reproducing data recorded on the magnetic disc of the hard disc drive 3 by the data recording and/or reproducing apparatus 1, the CPU-A 6 of the data processing device 2 identifies the name of the AV data stream to be reproduced, in accordance with the input information from the user interface, by the system management software of the firmware, to find the logical block address in the hard disc drive 3 in which the data making up the AV data stream has been recorded. The CPU-A 6 issues to the hard disc drive 3 a playback command defined on the host interface bus 4 by the hard disc device driver on the firmware. The hard disc drive 3 sequentially reads out data of the AV data stream from the magnetic disc 5, with one-track data as a read-out unit, based on a playback command.

The data of the AV data stream, read out from the magnetic disc 5, are corrected for errors in the hard disc drive 3 and subsequently routed over the host interface bus 4 to the data processing device 2.

If, in the data recording and/or reproducing apparatus 1 according to the present invention, data corrected for errors in the hard disc drive 3 is found to be still corrupted with errors, the operation of monitoring the state of the buffer memory transiently storing the data read out from the magnetic disc 5 and of re-reading the data corrupted with errors from the magnetic disc 5 responsive to the state of the buffer memory, that is the so-called retry operation, is switched to secure the real-time performance of data and to improve data quality simultaneously, as during readout, under efficient utilization of the buffer memory. The switching of the retry operation during reproduction will be explained subsequently.

The data read out by the hard disc drive 3 from the magnetic disc 5 is sequentially transferred to the host memory 14 through the host interface bus 4, AV interface 10 and the memory control circuit 11.

On completion of readout of a block of data, as a playback unit, a playback command is issued by the CPU-A 6 to the hard disc drive 3, as in the case of the above-described processing, so that next following data is read out by the hard disc drive 3 from the magnetic disc 5. The data read out from the magnetic disc 5 is sequentially transferred to the host memory 14.

The data transferred from the host memory 14 is sequentially sent out therefrom and inputted as an AV data stream through the memory control circuit 11 to the AV decoder 13. The AV data stream, inputted to the AV decoder 13, is demultiplexed in the MUX 18 in the AV decoder 13 into compressed digital moving picture data and compressed digital audio data.

If the compressed digital moving picture data, demultiplexed in the MUX 18, is corrupted with errors, the errors are interpolated from neighboring data in a moving picture data interpolation circuit 19. The compressed digital moving picture data is expanded by a picture data expansion unit 20 and outputted as customary digital picture data at the AV decoder 13.

These digital moving picture data and digital audio data are converted by a D/A converter, not shown, into analog picture and audio signals, which then are routed to an external device, such as a monitor.

FIG. 4 shows a recording command issued over the host interface bus 4 to the hard disc drive 3 by the CPU-A 6 of the data processing device 2 in the data recording and/or reproducing apparatus 1 according to the present invention.

Similarly to the ATA standard recording command, the recording command has the number of writing sectors specified by a sector count register. Meanwhile, a sector is the smallest recording and/or reproducing unit in the hard disc drive 3. In this recording command, the writing start logic block address is specified in lower four bits of a sector number register, a cylinder low register, a cylinder high register and a device/head register. For example, if a command discriminating code 87h is specified in this command register, it can be discriminated that this command is a command for recording data of the AV data stream. Also, in this recording command, the attribute of the recording data is specified in a features register.

FIG. 5 shows a playback command issued by the CPU-A 6 of the data processing device 2 through the host interface bus 4 to the hard disc drive 3 in the data recording and/or reproducing apparatus 1 according to the present invention.

In this playback command, as in the ATA standard playback command, the number of read-out sectors is specified in the sector count register, whilst the readout start logic address is specified in the lower order four bits of the cylinder high register and in the device/head register. Also, in this playback command, the type of the command is specified in the command register. For example, if the command discrimination code 86h is specified in the command register, this command is found to be a command for reproducing data of the AV data stream. Moreover, in this recording command, the attribute of the playback data is specified in the features register.

Figure 6:
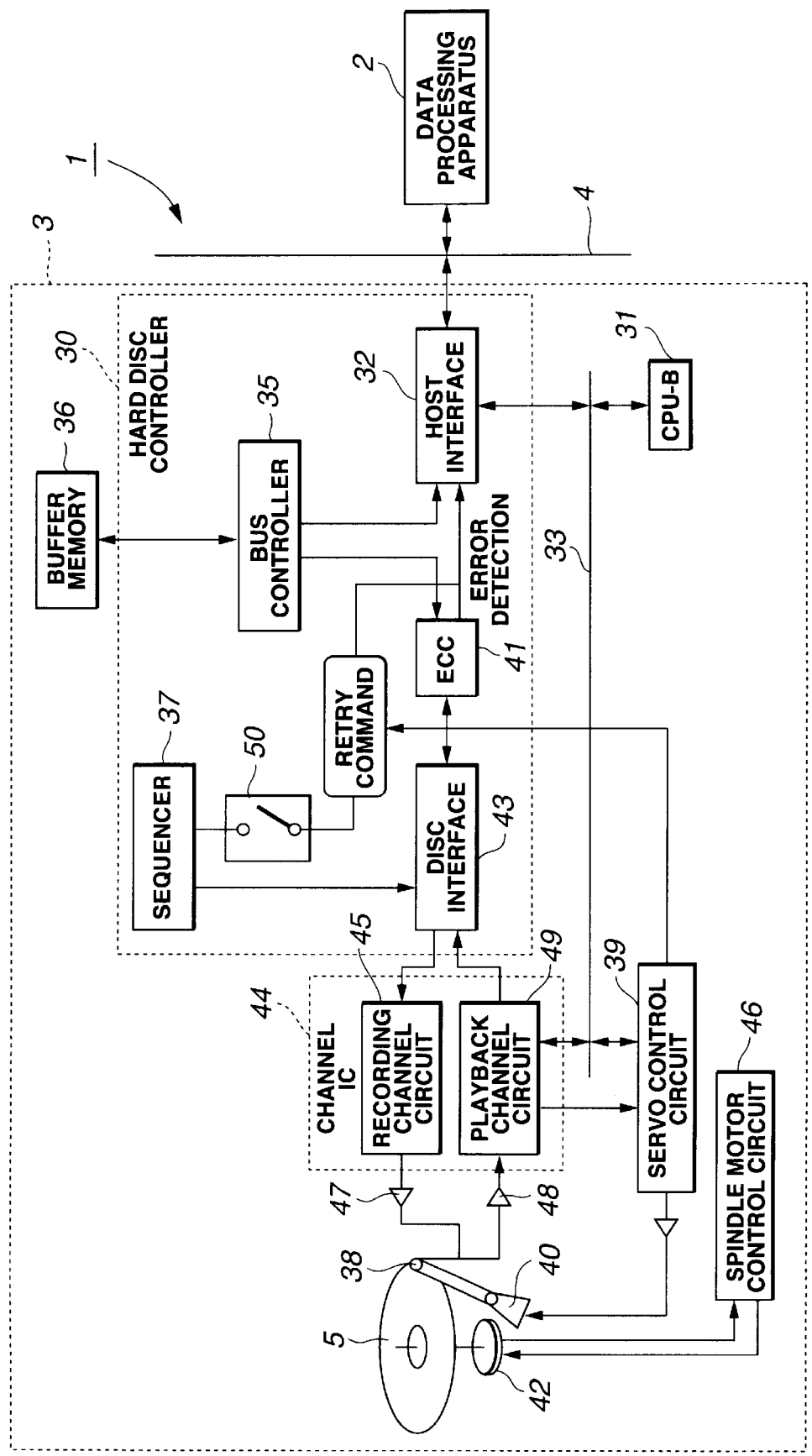
FIG. 6 is a block diagram showing an illustrative structure of a data recording and/or reproducing apparatus embodying the present invention and specifically showing details of the inside of the hard disc drive.

FIG. 6 shows a detailed block diagram of the inside of the hard disc drive 3 of the data recording and/or reproducing apparatus 1 according to the present invention. The processing flow of writing data supplied from the data processing device 2 by this hard disc drive 3 on the magnetic disc 5 is now explained.

In writing data supplied from the data processing device 2 on the magnetic disc 5 by this hard disc drive 3, the recording command, issued by the CPU-A 6 of the data processing device 2 over the host interface bus 4, is routed through a hard disc controller 30 to a CPU-B 31. Specifically, this recording command is inputted to a host interface 32 in the hard disc controller 30, connected over the host interface bus 4 to the data processing device 2, from one block of data as a recording unit to another. The recording command, inputted to the host interface 32, is transferred to the CPU-B 31, connected to the host interface 32 over a CPU-B bus 33.

To the host interface 32 in the hard disc controller 30, data for recording is sequentially supplied from the data processing device 2 over the host interface bus 4.

If fed with a recording command, the CPU-B 31 cooperates with the hard disc controller 30 to convert the logic block address of a cluster, sent from the data processing device 2 to the host interface 32, into a physical address in the hard disc drive 3, such as a disc surface number, track number or sector number.

The CPU-B 31 also instructs a sequencer 37 in which sector on the magnetic disc 5 the data supplied from the data processing device 2 is to be recorded.

The data supplied to the host interface 32 is transiently stored in a buffer memory 36.

A magnetic head 38 is positioned on the magnetic disc 5 in such a manner that a servo control circuit 39, receiving a target track number from the CPU-B 31 and the host interface 32, computes the position of the current magnetic head 38, based on the track number on the magnetic disc 5 as detected by the magnetic head 38, with the driving current of a voice coil motor (VCM) 40 responsible for causing the movement of the magnetic head 38 being then controlled based on the current position of the magnetic head 38.

When the sequencer 37 confirms that the magnetic head 38 is at the target position, the sequencer splits the data transiently stored in the buffer memory 36 into data lengths corresponding to a logical data sector length as set in the hard disc drive 3 to sequentially read out the data from one track data of the magnetic disc 5 as a writing unit to another.

The data read out from the buffer memory 36 is routed to an error correcting code (ECC) circuit 41 where an error correction code is appended to the data on the sector basis.

Each sector of data, to which the error correction code has been appended in the ECC circuit 41, is transferred over a disc interface 43 to a recording channel circuit 45 in a channel IC 44, in synchronism with rotation of the magnetic disc 5 rotationally driven by a spindle motor 42. The rotational speed of the magnetic disc by the spindle motor 42 is controlled by a spindle motor control circuit; 46.

The recording channel circuit 45 in the channel IC 44 performs processing, such as channel coding, on each sector of data transferred over the disc interface 43, to convert these sectors into binary valued signals conforming to characteristics of the recording channel made up of the magnetic bead 38 and the magnetic disc 5. These binary valued signals are associated with the rectangular waveform of the recording current and written by the magnetic head 38 on the magnetic disc 5 as a magnetization inversion pattern from one track data of the magnetic disc 5 to another. The operating timing of the disc interface 43 is controlled by the sequencer 37.

Meanwhile, if, in the present data recording and/or reproducing apparatus 1, data is to be recorded in an amount exceeding the capacity of the buffer memory 36 of the hard disc drive 3, data transfer from the data processing device 2 to the hard disc drive 3 is transiently halted at a time point an amount of data just sufficient to be stored in the buffer memory 36 has been transferred. The data transiently stored in the buffer memory 36 is read put from the buffer memory 36 so as to be sequentially recorded on the magnetic disc 5.

If the data transiently stored in the buffer memory 36 is recorded on the magnetic disc 5 so that a free space corresponding to one track of data is produced in the buffer memory 36, data transfer is re-initiated. The next following data is transferred from the data processing device 2 to the hard disc drive 3 in an amount corresponding to the free space in the buffer memory 36. The data recording and/or reproducing apparatus 1 repeats the above-described processing to sequentially record the amount of data exceeding the capacity of the buffer memory 36 on the magnetic disc 5.

There are occasions wherein, during recording of data on the magnetic disc 5, the servo control circuit 39 detects that, due to the excessively large head position signal, it is difficult to continue the regular operation (writing error). In such case, the hard disc drive 3 performs the following processing:

That is, if a writing error has been detected by the servo control circuit 39, a CPU-B 31 first monitors the state of the buffer memory 36 at a time point the writing error has been detected. The CPU-B 31 grasps the amount of data transferred from the data processing device 2 to the hard disc drive 3 and transiently stored in the buffer memory 36, and the amount of data read out from the buffer memory 36, and finds the amount of effective data in the buffer memory 36, based on the grasped data amounts, to grasp the state of the buffer memory 36 at the time point of detection of the writing error.

The hard disc drive 3 switches the operating mode, based on the state of the buffer memory 36 at the time point of detection of the writing error, that is switches between the mode of performing a retry operation to re-write data corrupted with the writing error on the magnetic disc 5 (mode A) and the mode of sending the information advising the effect of the occurrence of the writing error to the data processing device 2 without performing a retry operation (mode B).

Specifically, this mode switching is performed by comparing the free space of the buffer memory 36 at the time of occurrence of the writing error and the amount of next following data stored in the buffer memory 36 during the time one-track data of the magnetic disc 5 (amount of data corresponding to the writing unit) is written on the magnetic disc 5.

If the free space of the buffer memory 36 at the time of occurrence of the writing error exceeds the amount of next following data stored in the buffer memory 36 during the time one-track data is written on the magnetic disc 5, the mode A is set. If the mode A is set, a switch 50 is closed and a command for a retry operation is issued to the sequencer 37.

If the command for retry operation is given to the sequencer 37, the sequencer transfers to the retry mode to re-write the data corrupted with the writing error on the magnetic disc 5.

Conversely, if the free space of the buffer memory 36 on occurrence of the writing error is lesser than the amount of next following data stored in the buffer memory 36 during the time one-track data is written on the magnetic disc 5, the mode B is set. If the mode B is set, the switch 50 is opened, whilst no command for retry is given to the sequencer 37. Therefore, no retry operation is performed at this time. In such case, the information to the effect that the writing error has been produced is routed from the hard disc drive 3 over the host interface bus 4 to the data processing device 2.

If the retry operation is performed in the hard disc drive 3, next following data is not recorded. On the other hand, since data to be recorded is data of the AV data stream required to be real-time data, it is continuously transferred from the data processing device 2 to the hard disc drive 3. Therefore, if the retry operation is performed when there is no sufficient free space in the buffer memory 36, it may be an occurrence that the buffer memory 36 is allowed to overflow so that next following data is continuously discarded.

In the data recording and/or reproducing apparatus 1 according to the present invention, in which the mode A is set to perform the retry operation only when there is sufficient free space in the buffer memory 36, whilst the mode B is set and no retry operation is performed if there is no sufficient free space in the buffer memory 36, it is possible to perform the retry operation efficiently to such an extent that the buffer memory 36 is not allowed to overflow to achieve the real-time performance as well as to achieve improved data reliability.

In the above case, the amount of the next data stored in the buffer memory 36 during the time an amount of data corresponding to a track of the magnetic disc 5 is written on the magnetic disc 5 is set as a threshold value for verifying whether or not a sufficient free space is available in the buffer memory 36. Alternatively, the amount of data equal to n times the amount of next data (n being a natural number) stored in the magnetic disc 5 during the time one track data is written on the magnetic disc 5 may be set as the threshold value.

If the threshold value in verifying whether or not there is sufficient free space in the buffer memory 36 is set to a data volume equal to n times the amount of next data stored in the magnetic disc 5 during the time one track data is written on the magnetic disc 5, there is no risk of the buffer memory 36 overflowing even if the retry operation is repeated n times on end. Therefore, if the writing error is not resolved by a sole retry operation, it is possible to allow for repetition of up to n times of the retry operations.

The mode switching between the modes A and B may also be performed by comparing the volume of data stored in the buffer memory 36 on occurrence of the writing error to the volume of one-track data of the magnetic disc 5.

If the volume of data stored in the buffer memory 36 on occurrence of the writing error is lesser than the volume of one-track data of the magnetic disc 5, the mode A is set, and the retry operation is executed.

If the volume of data stored in the buffer memory 36 on occurrence of the writing error exceeds the volume of one-track data of the magnetic disc 5, the mode B is set. In such case, the information to the effect that a writing error has been produced is routed from the hard disc drive 3 over the host interface bus 4 to the data processing device 2 without performing the retry operation.

If no sufficient data is stored in the buffer memory 36, that is if the amount of data stored in the buffer memory 36 is lesser than the amount of the one-track data of the magnetic disc 5 as the data writing unit, the contents of the buffer memory 36 may be depleted to terminate the recording operation transiently even though an attempt is made to write the next following data without performing the retry operation. In such case, it is desirable to perform the retry operation at any rate to exploit the time efficiently to improve data reliability.

In the data recording and/or reproducing apparatus 1 according to the present invention, in which, if no sufficient volume of data is stored in the buffer memory 36, the mode A is set to perform the retry operation, whereas, if there is sufficient amount of data stored in the buffer memory 36, the mode B is set so as not to perform the retry operation, by way of mode switching, it is possible to exploit the buffer memory 36 efficiently to achieve the real-time performance as well as to achieve high data reliability.

In the above-described embodiment, the amount of data corresponding to one track of the magnetic disc 5, as the data writing unit, is set as a threshold value in verifying whether or not a sufficient amount of data has been stored in the buffer memory 36. Alternatively, an amount of data corresponding to n times the amount of data corresponding to one track, n being a natural number, may also be set as a threshold value.

Meanwhile, if the processing of reading out data from the buffer memory 36 to write the data on the magnetic disc 5 and the processing of storing the data transferred from the data processing device 2 in the buffer memory 36 are to be performed in parallel, next following data is stored in the buffer memory 36 during the time one-track data is read out from the buffer memory 36 and written on the magnetic disc 5. It is therefore desirable in such case to verify whether or not a sufficient amount of data has been stored in the buffer memory 36 based on the data volume corresponding to the sum of the amount of data stored in the buffer memory 36 on occurrence of the writing error and the amount of the next following data stored in the buffer memory 36 during the time one-track data is written on the magnetic disc 5.

In such case, the mode switching on occurrence of the writing error is performed by comparing the amount of data corresponding to the sum of the amount of data stored in the buffer memory 36 on occurrence of a writing error and the amount of the next following data stored in the buffer memory 36 during the time one-track data is written on the magnetic disc 5 to the one-track data of the magnetic disc 5.

If the amount of data corresponding to the sum of the amount of data stored in the buffer memory 36 on the occurrence of the writing error and the amount of the next following data stored in the buffer memory 36 during the time one-track data is written on the magnetic disc 5 is lesser than the one-track data of the magnetic disc 5, the mode A is set to perform the retry operation.

If the amount of data corresponding to the sum of the amount of data stored in the buffer memory 36, on occurrence of the writing error and the amount of next data stored in the buffer memory 36 during the time one-track data is written in the magnetic disc 5 exceeds the amount of one-track data, the mode B is set. The retry operation is not performed, but the information stating the effect that the writing error has been produced is sent from the hard disc drive 3 over the host interface bus 4 to the data processing device 2.

If it has been verified whether or not a sufficient amount of data has been stored in the buffer memory 36 based on the amount of data corresponding to the sum of the amount of data stored in the buffer memory 36 on occurrence of the writing error and the amount of next data stored in the buffer memory 36 during the time one-track data is written in the magnetic disc 5, the data recording and/or reproducing apparatus 1 is able to comprehend the instantaneous state in the buffer memory 36 more efficiently to achieve the real-time performance and improved data reliability simultaneously.

It is also possible in such case to set the threshold value based on which to verify whether or not a sufficient amount of data has been stored in the buffer memory 36 to a data volume corresponding to n times the one-track data volume, where n is a natural number.

The processing flow in reading out data from the magnetic disc 5 by the hard disc drive 3 shown in FIG. 5 to route the read-out data to the data processing device 2 is hereinafter explained. When reading out data from the magnetic disc 5 and routing the read-out data to the data processing device 2, a playback command, issued by the CPU-A 6 of the data processing device 2 over the host interface bus 4, is routed over the hard disc controller 30 to the CPU-B 31. Specifically, this playback command is routed to the host interface 32 in the hard disc controller 30, connected to the data processing device 2 over the host interface bus 4, from one block of data as a playback unit to another. This playback command, routed to the host interface 32, is transferred to the CPU-B 31 connected to the host interface 32 over the CPU-B bus 33.

When fed with the playback command, the CPU-B 31 cooperates with the hard disc controller 30 to convert the logical block address of data read out from the magnetic disc 5 to a physical address in the interior of the hard disc drive 3, such as a disc side number, track number or the sector number. The CPU-B 31 operates the servo control circuit 39 to move the magnetic head 38 to the target physical address. The magnetic head 38 reads out, from a location on the magnetic disc corresponding to the target physical address, the magnetization inversion pattern recorded thereon.

The magnetization inversion pattern, read out by the magnetic disc 38 from the magnetic disc 5, is amplified by a playback amplifier 48 and routed to a playback channel circuit 49 in the channel IC 44.

The signals sent to the playback channel circuit 49 is bit-synchronized and subsequently detected as binary-valued data by this playback channel circuit 49. The detected binary-valued data is decoded by way of back conversion of the channel coding applied in recording, and is reproduced as data sector. This data sector, which may occasionally is corrupted with errors, is directly transferred to the disc interface 43 in the hard disc controller 30.

The operating timing of the disc interface 43 is controlled by the sequencer 37. On confirming that the magnetic head 38 is at the target position, the sequencer 37 captures the playback data from the playback channel circuit 49 of the channel IC 44 through the disc interface 43 to route the playback data to an ECC circuit 41.

The ECC circuit 41 corrects the playback data routed thereto from the disc interface 43 for errors. The playback data, corrected for errors by the ECC circuit 41, is transiently stored in the buffer memory 36, as 512 byte logical data, on the sector basis, under control by a bus controller 35. The data stored in the buffer memory 36 is sequentially transferred to the data processing device 2 through the host interface 32 and the host interface bus 4.

If, in the data recording and/or reproducing apparatus 1, an amount of data exceeding the capacity of the buffer memory 36 of the hard disc drive 3 is to be reproduced, dta readout fronm the magnetic disc 5 is transiently halted at a time point when just as much of the data as can be stored in the buffer memory 36 has been read out. The data transiently stored in the buffer memory 36 is read out from the buffer memory 36 and transferred to the data processing device 2.

If, as a result of the data transiently stored in the buffer memory 36 has been transferred to the data processing device 2, a free space is produced in the buffer memory 36 corresponding to the amount of one-track data of the magnetic disc 5, data readout from the magnetic disc 5 is re-initiated. The next following data is read out in an amount corresponding to the free space of the buffer memory 36 from the magnetic disc 5. The data recording and/or reproducing apparatus 1 is configured to repeat the above-described processing to reproduce data in an amount exceeding the capacity of the buffer memory 36.

There are occasions wherein the data corrected by errors by the ECC circuit are detected to be further corrupted with errors at the time of reproduction. In such case, the hard disc drive 3 performs the following processing.

If the ECC circuit 41 detects that the data corrected for errors are further corrupted with errors, the CPU-B 21 first monitors the state of the buffer memory 36 at the time point of error detection. The CPU-B 21 has grasped the amount of data read out from the magnetic disc 5 and transiently stored via the ECC circuit 41 in the buffer memory 36 and the amount of data read out from the buffer memory 36 and transferred to the data processing device 2. Based in these data amounts, the CPU-B 21 computes the amount of effective data in the buffer memory 36 to grasp the state of the buffer memory 36 at the time point of error detection.

Depending on the state of the buffer memory 36 at the time point of error detection, the hard disc drive 3 switches between the mode of performing a retry operation ti re-read the data corrupted with errors from the magnetic disc 5 (mode A) and the mode of routing the information stating the effect of error occurrence to the data processing device 2 without performing the retry operation.

Specifically, this switching is performed based on comparison between the amount of data stored in the buffer memory 36 on error detection and that is transferred from the buffer memory 36 to the data processing device 2 during the time one-track data of the magnetic disc (amount of data corresponding to a readout unit) is read out from the magnetic disc 5.

If the amount of data stored in the buffer memory 36 on error detection exceeds that transferred from the buffer memory 36 to the data processing device 2 during the time one-track data is read out from the magnetic disc 5, the mode A is set. If the mode A is set, the switch 50 is closed such the the sequencer 37 issues a command for a retry operation.

If a command for a retry operation is issued, the sequencer 37 transfers to the retry mode to re-read the error-corrupted data from the magnetic disc 5.

If the amount of data stored in the buffer memory 36 on error detection is lesser than that transferred from the buffer memory 36 to the data processing device 2 during the time one-track data is read out from the magnetic disc 5, the mode B is set. If the mode B is set, the switch 50 is opened, such that no command for retry is issued to the sequencer 37. Thus, in such case, no retry operation is carried out, but the information stating the effect of error occurrence is routed from the hard disc drive 3 over the host interface bus 4 to the data processing device 2.

If, in the hard disc drive 3, a retry operation is performed, next following data is not reproduced. On the other hand, the data stored in the buffer memory 36 is transferred in real-time towards the data processing device 2, so that, if the retry operation is performed as a sufficient amount of data has not been stored in the buffer memory 36, the contents of the buffer memory 36 are depleted so that the playback operation is halted transiently to detract from the real-time performance.

In the data recording and/or reproducing apparatus 1 according to the present invention, in which the mode A is set only if a sufficient amount of data has been stored in the buffer memory 36 to perform the retry operation, and in which the mode B is set if otherwise, so that no retry operation is performed, it becomes possible to perform the retry operation efficiently to such an extent that the contents of the buffer memory 36 are not depleted to secure the real-time performance and improved data reliability simultaneously.

In the above-described embodiment, the amount of data stored in the buffer memory 36 for transfer to t he data processing device 2 during the time the amount of data for one track of the magnetic disc 5 is set as a threshold value for verifying whether or not a sufficient amount of data has been stored in the buffer memory 36. Alternatively, the amount of data equal to n times the amount of data transferred from the buffer memory 36 to the data processing device 2 during the time the amount of data for one track is read out from the magnetic disc 5, where n is a natural number, may also be set as the threshold value.

If the amount of data equal to n times the amount of data transferred from the buffer memory 36 to the data processing device 2 during the time the amount of data for one track is read out from the magnetic disc 5 is set as the threshold value in verifying whether or not a sufficient amount of data has been stored in the buffer memory 36, the contents of the buffer memory 36 are not depleted even if the retry operation is repeated n times on end. Thus, up to n times of repeated retry operations can be tolerated if the error is not removed by a sole retry operation.

The switching between the modes A and B may be made based on comparison between the free space in the buffer memory 36 and the amount of data for one track of the magnetic disc 5.

If the free space of the buffer memory 36 on error detection is lesser than the amount of data for one track, the mode A is set to perform the retry operation.

On the other hand, if the free space of the buffer memory 36 on error detection exceeds the data quantity for one track, the mode B is set. In such case, no retry operation is performed, but the information stating that the error has occurred is routed from the hard disc drive 3 to the data processing device 2 through the host interface bus 4.

If there is no sufficient free space in the buffer memory 36, that is if the free space of the buffer memory 36 on error detection is lesser than the amount of data for one track of the magnetic disc 5 as a readout unit, the buffer memory 36 overflows to halt the playback operation transiently, even though an attempt is made to read out the next following data without performing the retry operation. It is therefore desirable in such case to perform the retry operation at any rate to consume time efficiently to improve data reliability.

In the data recording and/or reproducing apparatus 1 according to the present invention, in which, if there is no sufficient free space in the buffer memory 36, the mode A is set to perform the retry operation, whereas, if there is sufficient free space in the buffer memory 36, the mode B is set so as not to perform the retry operation, the buffer memory 36 can be utilized efficiently to achieve the real-time performance and improved data reliability simultaneously.

In the above-described embodiment, the amount of data for one track of the magnetic disc 5, as a readout unit, is set as a threshold value in verifying whether or not there is sufficient free space in the buffer memory 36. Alternatively, the amount of data equal to n times the amount of one-track data, where n is a natural number, may be set as the threshold value.

Meanwhile, if the processing of reading out data from the magnetic disc 5 for storage in the buffer memory 36 is performed in parallel with the operation of transferring data from the buffer memory 36 to the data processing device 2, the data stored in the buffer memory 36 is continuously transferred to the data processing device 2 so as to be stored in the buffer memory 36 during the time the one-track data is read out from the magnetic disc 5. Therefore, it is desirable in such case to set an amount of data corresponding to the amount of data for one track less the amount of data transferred from the buffer memory 36 to the data processing device 2 during the time the one-track data is read out from the magnetic disc 5 as a threshold value in verifying whether or not there is sufficient free space in the buffer memory 36 at the time point of error detection.

In such case, mode switching between the modes A and B is by comparing the free space of the buffer memory 36 on error detection to the amount of data for one track less the amount of data transferred from the buffer memory 36 to the data processing device 2 during the time the one-track data is read out from the magnetic disc 5.

If the free space of the buffer memory 36 on error detection is lesser than the amount of data for one track less the amount of data transferred from the buffer memory 36 to the data processing device 2 during the time the one-track data is read out from the magnetic disc 5, the mode A is set to perform the retry operation.

If conversely the free space of the buffer memory 36 on error detection is not less than the amount of data for one track less the amount of data transferred from the buffer memory 36 to the data processing device 2 during the time the one-track data is read out from the magnetic disc 5, the mode B is set. At this time, the information to the effect that an error has occurred is routed from the hard disc drive 3 over the host interface bus 4 to the data processing device 2 without performing the retry operation.

In the data recording and/or reproducing apparatus 1 according to the present invention, in which, in verifying whether or not there is sufficient free space in the buffer memory 36 at the time point of error detection, an amount of data corresponding to the amount of data for one track less the amount of data transferred from the buffer memory 36 to the data processing device 2 during the time the data for one track is read out from the magnetic disc 5 is set as a threshold value, the buffer memory 36 can be utilized efficiently to achieve the real-time performance and improved data reliability simultaneously.

In such case, an amount of data equal to n times the amount of data for one track less the amount of data transferred from the buffer memory 36 to the data processing device 2 during the time the data for one track is read out from the magnetic disc 5, n being a natural number, may be set as a threshold value.

In the foregoing, the data recording and/or reproducing apparatus 1 is taken as an example, in which the data making up an AV data stream required to be real-time data is recorded on the magnetic disc in the hard disc drive 3 and data making up the AV data stream recorded on the magnetic disc 5 is reproduced. However, the data recording and/or reproducing apparatus embodying the present invention is not limited to this configuration and may also be applied to digital data other than the AV data stream, such as a document file. The digital data, such as the document file, is not required to be real-time data, however, it is required to be high in data reliability, that is, it is required to suffer only an extremely small amount of data errors. Therefore, if the data recording and/or reproducing apparatus is constructed for recording and/or reproducing not only the AV data stream but also other digital data such as document files, the processing contents are desirably made to differ depending on whether the data being handled is data of the AV data stream or digital data other than the AV data stream.

The recording processing flow and the reproducing processing flow of a data recording and/or reproducing apparatus constructed for recording and/or reproducing not only the AV data stream but also other digital data is hereinafter explained. Meanwhile, the present data recording and/or reproducing apparatus has the basic structure in common with the above-described data recording and/or reproducing apparatus 1 and performs similar processing to that of the data recording and/or reproducing apparatus 1 except the retry processing. Therefore, the description of the processing similar to that performed by the data recording and/or reproducing apparatus 1 is omitted and only portions essential to the recording and/or reproducing apparatus constructed for recording and/or reproducing not only the AV data stream but also other digital data are hereinafter explained using the same reference numerals for the corresponding components as those of the data recording and/or reproducing apparatus 1.

If the digital data is recorded on the magnetic disc 5 by the present data recording and/or reproducing apparatus, the data for recording is checked as to whether it is data making up an AV data stream by a recording command being issued from the data processing device 2 over the host interface bus 4 so as to be sent to the CPU-B 31 of the hard disc drive 3. Specifically, from the command register of the recording command shown in FIG. 4 the data for recording is checked as to whether it is data making up an AV data stream.

If the data for recording is recognized to be data making up the AV data stream, the CPU-B 31 monitors the state of the buffer memory 36 at the time point a writing error has occurred in the recording data. Depending on the state of the buffer memory 36 at the time point of occurrence of the writing error, mode switching is made between the mode A allowing for the retry operation and the mode B inhibiting the retry operation and transferring the information indicating the occurrence of the writing error, as in the above-described data recording and/or reproducing apparatus 1.

If conversely the data for recording is recognized to be data other than the data making up the AV data stream, the sequencer 37 at the time of occurrence of a writing error in the recording data performs the operation of repeatedly performing the retry operation until the writing error ceases to be produced.

With the present data recording and/or reproducing apparatus, if the recording data is data making up the AV data stream required to be real-time data, the retry operation of re-writing data corrupted with the produced writing error on the magnetic disc 5 is selectively performed depending on the state of the buffer memory 36 at the time point of occurrence of the writing error. Thus, data required to be real-time data can be optimally recorded so that the reproduced data will be deteriorated to the minimum extent on reproduction as the real-time performance is maintained.

If, with the present data recording and/or reproducing apparatus, the recording data is other than the data making up the AV data stream, the processing of repeating the retry operation a number of times is performed, at the time of occurrence of the writing error, until the writing error ceases to be produced, thus effectively suppressing error occurrence on playback to improve data reliability appreciably.

If the digital data recorded on the magnetic disc 5 is reproduced by the present data recording and/or reproducing apparatus, the playback command, issued by the data processing device 2 over the host interface bus 4, is routed to the CPU-B 31 of the hard disc drive 3, to verify whether or not the data for reproduction is data making up the AV data stream. Specifically, from the command register of the playback command shown in FIG. 4, the data for reproduction is verified as to whether it is data making up the AV data stream.

If, when the data for reproduction is recognized to be data making up the AV data stream, the data corrected for errors is detected to be further corrupted with errors, as in the case of the above-described data recording and/or reproducing apparatus 1, the CPU-B 31 monitors the state of the buffer memory 36 at the time point of error detection. Depending on the state of the buffer memory 36 at the time point of error detection, mode switching is made between the mode A which allows for the retry operation and the mode B which inhibits the retry operation to transfer the information indicating the error occurrence, as in the case of the above-described data recording and/or reproducing apparatus 1.

On the other hand, if, when the playback data is recognized to be data other than the data making up the AV data stream, the data corrected for errors is detected to be further corrupted with errors, the sequencer 37 repeatedly performs the retry operation until the errors cease to be produced.

With the present data recording and/or reproducing apparatus, if, when the data for reproduction is data making up the AV data stream required to be real-time data, the data corrected for errors is detected to be further corrupted with errors, the retry operation of re-reading the error-corrupted data from the magnetic disc 5 is selectively performed depending on the state of the buffer memory 36 at the time point of error detection, the data required to be real-time data can be optimally recorded, as the real-time performance is kept, such as to minimize deterioration in the data quality.

With the present data recording and/of reproducing apparatus, if, when the data for reproduction is other than the data making up the AV data stream required to be real-time data, the data corrected for errors is detected to be further corrupted with errors, the retry operation is repeated until the error ceases to be produced, thus effectively suppressing the error occurrence to improve data reliability appreciably.

What is claimed is:

1. A data recording apparatus for recording compressed moving picture data on a recording medium, comprising:

data storage means for transiently storing moving picture data to be written in said recording medium;

retry means for re-writing data corrupted with a writing error on said recording medium if such writing error has been produced during the recording operation; and switching means for switching the operation of said retry means depending on the state of said data storage means at the time of production of said writing error, wherein said switching means compares the free space of said data storage means at the time of occurrence of a writing error to an amount of data stored in said data storage means during the time moving picture data of a data volume written at a time on said recording medium is written on said recording medium;

if the free space of the data storage means at the time of occurrence of the writing error exceeds the amount of data stored in said data storage means during the time moving picture data of a data volume written at a time on said recording medium is written on said recording medium, said retry means is operated; and wherein if the free space of the data storage means at the time of occurrence of the writing error is lesser than the amount of data stored in said data storage means during the time moving picture data of a data volume written at a time on said recording medium is written on said recording medium, switching is made to not performing the retry operation.

2. A data recording apparatus for recording compressed moving picture data on a recording medium, comprising:

data storage means for transiently storing moving picture data to be written in said recording medium;

retry means for re-writing data corrupted with a writing error on said recording medium if such writing error has been produced during the recording operation; and switching means for switching the operation of said retry means depending on the state of said data storage means at the time of production of said writing error, wherein said switching means compares the free space of said data storage means at the time of occurrence of a writing error to an amount of data equal to n times the amount of data stored in said data storage means during the time moving picture data of a data volume written at a time on said recording medium is written on said recording medium, n being an integer;

if the free space of the data storage means at the time of occurrence of the writing error exceeds the amount of data equal to n time the amount of data stored in said data storage means during the time moving picture data of a data volume written at a time on said recording medium is written on said recording medium, said retry means is operated; and wherein if the free space of the data storage means at the time of occurrence of the writing error is lesser than the amount of data equal to n times the amount of data stored in said data storage means during the time moving picture data of a data volume written at a time on said recording medium is written on said recording medium, switching is made to not performing the retry operation.

3. A data recording apparatus for recording compressed moving picture data on a recording medium, comprising:

data storage means for transiently storing moving picture data to be written in said recording medium;

retry means for re-writing data corrupted with a writing error on said recording medium if such writing error has been produced during the recording operation; and switching means for switching the operation of said retry means depending on the state of said data storage means at the time of production of said writing error, wherein said switching means compares the amount of data stored in said data storage means at the time of occurrence of a writing error to the amount of data written at a time on said recording medium;

if the amount of data stored in said data storage means at the time of occurrence of a writing error is lesser than the amount of data written at a time on said recording medium, said retry means is operated; and wherein if the amount of data stored in said data storage means at the time of occurrence of a writing error exceeds the amount of data written at a time on said recording medium, switching is made to not performing the retry operation.

4. A data recording apparatus for recording compressed moving picture data on a recording medium, comprising:

data storage means for transiently storing moving picture data to be written in said recording medium;

retry means for re-writing data corrupted with a writing error on said recording medium if such writing error has been produced during the recording operation; and switching means for switching the operation of said retry means depending on the state of said data storage means at the time of production of said writing error, wherein said switching means compares the amount of data stored in said data storage means at the time of occurrence of a writing error to an amount of data equal to n times the amount of data written at a time on said recording medium, n being a natural number;

if the amount of data stored in said data storage means at the time of occurrence of the writing error is lesser than the amount of data equal to n times the amount of data written at a time on said recording medium, said retry means is operated; and wherein if the amount of data stored in said data storage means at the time of occurrence of the writing error exceeds the amount of data equal to n times the amount of data written at a time on said recording medium, switching is made to not performing the retry operation.

5. A data recording apparatus for recording compressed moving picture data on a recording medium, comprising:

data storage means for transiently storing moving picture data to be written in said recording medium;

retry means for re-writing data corrupted with a writing error on said recording medium if such writing error has been produced during the recording operation; and switching means for switching the operation of said retry means depending on the state of said data storage means at the time of production of said writing error, wherein said switching means compares an amount of data equal to the sum of the amount of data stored in said data storage means at the time of occurrence of a writing error and the amount of data stored in said data storage means during the time moving picture data of a data volume written at a time on said record medium is written on the recording medium to an amount of data written at a time on said recording medium;

if the amount of data equal to the sum of the amount of data stored in said data storage means at the time of occurrence of a writing error and the amount of data stored in said data storage means during the time moving picture data of a data volume written at a time on said recording medium is written on the recording medium is lesser than the amount of data written at a time on said recording medium, said retry means is operated; and wherein if the amount of data equal to the sum of the amount of data stored in said data storage means at the time of occurrence of a writing error and the amount of data stored in said data storage means during the time moving picture data of a data volume written at a time on said recording medium is written on the recording medium exceeds the amount of data written at a time on said recording medium, switching is made to not performing the retry operation.

6. A data recording apparatus for recording compressed moving picture data on a recording medium, comprising:

data storage means for transiently storing moving picture data to be written in said recording medium;

retry means for re-writing data corrupted with a writing error on said recording medium if such writing error has been produced during the recording operation; and switching means for switching the operation of said retry means depending on the state of said data storage means at the time of production of said writing error, wherein said switching means compares an amount of data equal to the sum of the amount of data stored in said data storage means at the time of occurrence of a writing error and the amount of data stored in said data storage means during the time moving picture data of a data volume written at a time on said recording medium is written on the recording medium to an amount of data equal to n times the amount of data written at a time on said recording medium, n being a natural number;

if the amount of data equal to the sum of the amount of data stored in said data storage means at the time of occurrence of the writing error and the amount of data stored in said data storage means during the time moving picture data of a data volume written at a time on said recording medium is written on the recording medium is lesser than an amount of data equal to n times the amount of data written at a time on said recording medium, said retry means is operated; and wherein if the amount of data equal to the sum of the amount of data stored in said data storage means at the time of occurrence of a writing error and the amount of data stored in said data storage means during the time moving picture data of a data volume written at a time on said recording medium is written on the recording medium exceeds an amount of data equal to n times the amount of data written at a time on said recording medium, switching is made to not performing the retry operation.

7. The data recording apparatus according to any one of claims 1 to 6 further comprising:

error information outputting means for outputting to outside, the information indicating the occurrence of a writing error produced during the recording operation.

8. The data recording apparatus according to any one of claims 1 to 6 further comprising:

data writing means for writing said moving picture data on said magnetic disc by a magnetic head used as said recording medium.

9. A data recording apparatus for recording digital data on a recording medium comprising:

discriminating means for discriminating whether said digital data is compressed moving picture data or other data;

data storage means for transiently storing the digital data written on said recording medium;

retry means for rewriting on the recording medium data corrupted with a writing error produced during a recording operation; and switching means for switching between operating and not operating the retry means, depending on the state of said data storage means prevailing at the time of occurrence of a writing error, if said, discriminating means verifies the digital data to be the compressed moving picture data.

10. A data recording method wherein in recording compressed data on a recording medium switching is made between performing and not performing a retry operation of re-writing data corrupted with a writing error produced during a recording operation depending on the state of data storage means transiently storing the moving picture data to be written on said recording medium prevailing at the time of occurrence of the writing error, wherein the free space of said data storage means at the time of occurrence of the writing error is compared to the amount of data stored in said data storage means during the time the moving picture data written at a time on said recording medium is written on said recording medium;

if the free space of said data storage means at the time of occurrence of the writing error exceeds the amount of data stored in said data storage means during the time the moving picture data written at a time on said recording medium is written on said recording medium said retry operation is performed; and wherein if the free space of said data storage means at the time of occurrence of the writing error is lesser than the amount of data stored in said data storage means during the time the moving picture data written at a time on said recording medium is written on said recording medium, switching is made to not performing the retry operation.

11. A data recording method wherein in recording compressed data on a recording medium, switching is made between performing and not performing a retry operation of re-writing data corrupted with a writing error produced during a recording operation depending on the state of data storage means transiently storing the moving picture data to be written on said recording medium prevailing at the time of occurrence of the writing error, wherein the free space of said data storage means at the time of occurrence of the writing error is compared to an amount of data equal to n times the amount of data stored in said data storage means during the time the moving picture data written at a time on said recording medium is written on said recording medium, n being an integer;

if the free space of said data storage means at the time of occurrence of the writing error exceeds an amount of data equal to n times the amount of data stored in said data storage means during the time the moving picture data written at a time on said recording medium is written on said recording medium, said retry operation is performed; and wherein if the free space of said data storage means at the time of occurrence of the writing error is lesser than an amount of data equal to n times the amount of data stored in said data storage means during the time the moving picture data written at a time on said recording medium is written on said recording medium, switching is made to not performing the retry operation.

12. A data recording method wherein in recording compressed data on a recording medium, switching is made between performing and not performing a retry operation of re-writing data corrupted with a writing error produced during a recording operation depending on the state of data storage means transiently storing the moving picture data to be written on said recording medium prevailing at the time of occurrence of the writing error, wherein the amount of data stored in said data storage means at the time of occurrence of a writing error is compared to the amount of data written at a time on said recording medium;

if the amount of data stored in said data storage means at the time of occurrence of the writing error is lesser than the amount of data written at a time on said recording medium said retry operation is performed; and wherein if the amount of data stored in said data storage means at the time of occurrence of a writing error exceeds the amount of data written at a time on said recording medium, switching is made to not performing the retry operation.

13. A data recording method wherein in recording compressed data on a recording medium, switching is made between performing and not performing a retry operation of re-writing data corrupted with a writing error produced during a recording operation depending on the state of data storage means transiently storing the moving picture data to be written on said recording medium prevailing at the time of occurrence of the writing error, wherein the amount of data stored in said data storage means at the time of occurrence of a writing error is compared to an amount of data equal to n times the amount of data written at a time on said recording medium, n being a natural number;

if the amount of data stored in said data storage means at the time of occurrence of the writing error is lesser than the amount of data equal to n times the amount of data written at a time on said recording medium, said retry means is operated; and wherein if the amount of data stored in said data storage means at the time of occurrence of the writing error exceeds the amount of data equal to n times the amount of data written at a time on said recording medium, switching is made to not performing the retry operation.

14. A data recording method wherein
in recording compressed data on a recording medium, switching is made between performing and not performing a retry operation of re-writing data corrupted with a writing error produced during a recording operation depending on the state of data storage means transiently storing the moving picture data to be written on said recording medium prevailing at the time of occurrence of the writing error, wherein an amount of data equal to the sum of the amount of data stored in said data storage means at the time of occurrence of a writing error and the amount of data stored in said data storage means during the time moving picture data of a data volume written at a time on said recording medium is written on the recording medium is compared to an amount of data written at a time on said recording medium;

if the amount of data equal to the sum of the amount of data stored in said data storage means at the time of occurrence of a writing error and the amount of data stored in said data storage means during the time moving picture data of a data volume written at a time on said recording medium is written on the recording medium is lesser than the amount of data written at a time on said recording medium, said retry means is operated; and wherein if the amount of data equal to the sum of the amount of data stored in said data storage means at the time of occurrence of a writing error and the amount of data stored in said data storage means during the time moving picture data of a data volume written at a time on said recording medium is written on the recording medium exceeds the amount of data written at a time on said recording medium, switching is made to not performing the retry operation.

15. A data recording method wherein
in recording compressed data on a recording medium, switching is made between performing and not performing a retry operation of re-writing data corrupted with a writing error produced during a recording operation depending on the state of data storage means transiently storing the moving picture data to be written on said recording medium prevailing at the time of occurrence of the writing error, wherein an amount of data equal to the sum of the amount of data stored in said data storage means at the time of occurrence of a writing error and the amount of data stored in said data storage means during the time moving picture data of a data volume written at a time on said recording medium is written on the recording medium is compared to an amount of data equal to n times the amount of data written at a time on said recording medium, n being an integer;

if the amount of data equal to the sum of the amount of data stored in said data storage means at the time of occurrence of a writing error and the amount of data stored in said data storage means during the time moving picture data of a data volume written at a time on said recording medium is written on the recording medium is lesser than an amount of data equal to n times the amount of data written at a time on said recording medium, said retry means is operated; and wherein if the amount of data equal to the sum of the amount of data stored in said data storage means at the time of occurrence of a writing error and the amount of data stored in said data storage means during the time moving picture data of a data volume written at a time on said recording medium is written on the recording medium exceeds an amount of data equal to n times the amount of data written at a time on said recording medium, switching is made to not performing the retry operation.

16. The data recording method according to any one of claims 10 to 15 wherein
the information indicating the occurrence of :a writing error produced during the recording operation is outputted to outside.

17. The data recording method according to any one of claims 10 to 15 wherein
said moving picture data is written on said magnetic disc by a magnetic head used as said recording medium.

18. A data recording method for recording digital data on a recording medium comprising:
discriminating whether said digital data is compressed moving picture data or other data; wherein
if said digital data is verified to be compressed moving picture data, switching is made between performing and not performing a retry operation depending on the state at the time of occurrence of a writing error of data storage means transiently storing the digital data to be written on said recording medium, in case said writing error has occurred during the recording operation, said retry operation being an operation of re-writing data corrupted with said writing error on said recording medium.

19. A data reproducing apparatus for reproducing compressed moving picture data from a recording medium comprising:
data storage means for transiently storing moving picture data read out from said recording medium;
retry means for re-reading from said recording medium data corrupted with an error if such error is produced in the moving picture data read out from said recording medium; and
switching means for switching the operation of said retry means depending on the state of said data storage means at the time of occurrence of said error in the moving picture data read out from said recording medium, wherein
said switching means compares the amount of data stored in said data storage means at the time of occurrence of an error in moving picture data read out from said recording medium to the amount of data transferred from said data storage means during the time the moving picture data of a data volume read out at a time from the recording medium is read out;
if the amount of data stored in said data storage means at the time of occurrence of data in the moving picture data read out from the recording medium exceeds the amount of data transferred from the recording medium during the time the moving picture data of a data volume read out at a time from the recording medium is read out from the recording medium, said retry means is operated; and wherein
if the amount of data stored in said data storage means at the time of occurrence of data in the moving picture data read out from the recording medium is lesser than the amount of data transferred from the recording medium during the time the moving picture data of a data volume read out at a time from the recording medium is read out from the recording medium, switching is made to not operating said retry means.

20. A data reproducing apparatus for reproducing compressed moving picture data from a recording medium comprising:

data storage means for transiently storing moving picture data read out from said recording medium;

retry means for re-reading from said recording medium data corrupted with an error if such error is produced in the moving picture data read out from said recording medium; and switching means for switching the operation of said retry means depending on the state of said data storage means at the time of occurrence of said error in the moving picture data read out from said recording medium, wherein said switching means compares the amount of data stored in said data storage means at the time of occurrence of an error in moving picture data read out from said recording medium to an amount of data equal to n times the amount of data transferred from said data storage means during the time the moving picture data of a data volume read out at a time from the recording medium is read out, n being a natural number;

if the amount of data stored in said data storage means at the time of occurrence of data in the moving picture data read out from the recording medium exceeds an amount of data equal to n times the amount of data transferred from the recording medium during the time the moving picture data of a data volume read out at a time from the recording medium is read out from the recording medium, said retry means is operated; and wherein if the amount of data stored in said data storage means at the time of occurrence of data in the moving picture data read out from the recording medium is lesser than an amount of data equal to n times the amount of data transferred from the recording medium during the time the moving picture data of a data volume read out at a time from the recording medium is read out from the recording medium, switching is made to not operating said retry means.

21. A data reproducing apparatus for reproducing compressed moving picture data from a recording medium comprising:

data storage means for transiently storing moving picture data read out from said recording medium;

retry means for re-reading from said recording medium data corrupted with an error if such error is produced in the moving picture data read out from said recording medium; and switching means for switching the operation of said retry means depending on the state of said data storage means at the time of occurrence of said error in the moving picture data read out from said recording medium, wherein said switching means compares the free space of said data storage means at the time of occurrence of errors in moving picture data read out from said recording medium to the data volume read out at a time from said recording medium;

if the free space of said data storage means at the time of occurrence of errors in the moving picture data read out from the recording medium is lesser than the amount of data read out at a time from said recording medium, said retry means is operated;

if the free space of said data storage means at the time of occurrence of errors in the moving picture data read out from the recording medium exceeds the amount of data read out at a time from said recording medium, switching is made to not operating said retry means.

22. A data reproducing apparatus for reproducing compressed moving picture data from a recording medium comprising:

data storage means for transiently storing moving picture data read out from said recording medium;

retry means for re-reading from said recording medium data corrupted with an error if such error is produced in the moving picture data read out from said recording medium; and switching means for switching the operation of said retry means depending on the state of said data storage means at the time of occurrence of said error in the moving picture data read out from said recording medium, wherein said switching means compares the free space of said data storage means at the time of occurrence of errors in moving picture data read out from said recording medium to a data volume equal to n times the data volume read out at a time from said recording medium, n being an integer;

if the free space of said data storage means at the time of occurrence of errors in the moving picture data read out from the recording medium is lesser than the data volume equal to n times the amount of data read out at a time from said recording medium, said retry means is operated;

if the free space of said data storage means at the time of occurrence of errors in the moving picture data read out from the recording medium exceeds the data volume equal to n times the amount of data read out at a time from said recording medium, switching is made to not operating said retry means.

23. A data reproducing apparatus for reproducing compressed moving picture data from a recording medium comprising:

data storage means for transiently storing moving picture data read out from said recording medium;

retry means for re-reading from said recording medium data corrupted with an error if such error is produced in the moving picture data read out from said recording medium; and switching means for switching the operation of said retry means depending on the state of said data storage means at the time of occurrence of said error in the moving picture data read out from said recording medium, wherein said switching means compares the free space of said data storage means at the time of occurrence of errors in moving picture data read out from said recording medium to a data volume read out at a time from said recording medium less a data volume transferred from the data storage means during the time the moving picture data of a data volume read out at a time from said recording medium is read out from the recording medium;

if the free space of said data storage means at the time of occurrence of errors in the moving picture data read out from the recording medium is lesser than the data volume read out at a time from said recording medium less a data volume transferred from the data storage means during the time the moving picture data of a data volume read out at a time from said recording medium is read out from the recording medium, said retry means is operated; and wherein if the free space of said data storage means at the time of occurrence of errors in the moving picture data read out from the recording medium exceeds the data volume read out at a time from said recording medium less a data volume transferred from the data storage means during the time the moving picture data of a data volume read out at a time from said recording medium is read out from the recording medium, switching is made to not operating said retry means.

24. A data reproducing apparatus for reproducing compressed moving picture data from a recording medium comprising:

data storage means for transiently storing moving picture data read out from said recording medium;

retry means for re-reading from said recording medium data corrupted with an error if such error is produced in the moving picture data read out from said recording medium; and switching means for switching the operation of said retry means depending on the state of said data storage means at the time of occurrence of said error in the moving picture data read out from said recording medium, wherein said switching means compares the free space of said data storage means at the time of occurrence of errors in moving picture data read out from said recording medium to a data volume equal to n times the data volume read out at a time from said recording medium less a data volume transferred from the data storage means during the time the moving picture data of a data volume read out at a time from said recording medium is read out from the recording medium, where n is a natural number;

if the free space of said data storage means at the time of occurrence of errors in the moving picture data read out from the recording medium is lesser than a data volume equal to n times the data volume read out at a time from said recording medium less a data volume transferred from the data storage means during the time the moving picture data of a data volume read out at a time from said recording medium is read out from the recording medium, said retry means is operated; and wherein if the free space of said data storage means at the time of occurrence of errors in the moving picture data read out from the recording medium exceeds a data volume equal to n times the data volume read out at a time from said recording medium less a data volume transferred from the data storage means during the time the moving picture data of a data volume volume read out at a time from said recording medium is read out from the recording medium, switching is made to not operating said retry means.

25. The data reproducing apparatus according to any one of claims 19 to 24 further comprising:

error information outputting means for outputting to outside the information indicating occurrence of an error produced in the moving picture data read out from said recording medium.

26. The data reproducing apparatus according to any one of claims 19 to 24 further comprising:

data readout means for reading out said moving picture data on said magnetic disc by a magnetic head used as said recording medium.

27. A data reproducing apparatus for reproducing digital data from a recording medium comprising:

discriminating means for discriminating whether said digital data is compressed moving picture data or other data;

data storage means for transiently storing the digital data read out from said recording medium;

retry means for re-reading from said recording medium data corrupted with errors produced in the digital data read out from said recording medium; and changeover means for switching the operation of said retry means, depending on the state of said data storage means at the time of error occurrence in the digital data read out from said recording medium, in case said digital data has been verified by said discriminating to be compressed moving picture data.

28. A data reproducing method for reproducing compressed data from a recording medium, wherein switching is made between performing and not-performing the retry operation of re-reading from said recording medium error-corrupted moving picture data at the time of error occurrence depending on the state at the time of error occurrence in the moving picture data read out from the recording medium of data storage means transiently storing moving picture data read out from the recording medium, wherein the data volume stored in said data storage means at the time of occurrence of error in moving picture data read out from the recording medium is compared to the data volume transferred from said data storage means during the time the moving picture data of a data volume read out at a time from said recording medium is read out from said recording medium if the data volume stored in said data storage means at the time of occurrence of error in moving picture data read out from the recording medium exceeds the data volume transferred from said data storage means during the time the moving picture data of a data volume read out at a time from said recording medium is read out from said recording medium, said retry means is operated; and wherein if the data volume stored in said data storage means at the time of occurrence of error in moving picture data read out from the recording medium is lesser than the data volume transferred from said data storage means during the time the moving picture data of a data volume read out at a time from said recording medium is read out from said recording medium, switching is made to not performing said retry means.

29. A data reproducing method for reproducing compressed data from a recording medium, wherein switching is made between performing and not-performing the retry operation of re-reading from said recording medium error-corrupted moving picture data at the time of error occurrence depending on the state at the time of error occurrence in the moving picture data read out from the recording medium of data storage means transiently storing moving picture data read out from the recording medium, wherein the data volume stored in said data storage means at the time of occurrence of error in moving picture data read out from the recording medium is compared to a data volume n equal to n times the data volume transferred from said data storage means during the time the moving picture data of a data volume read out at a time from said recording medium is read out from said recording medium, n being a natural number;

if the data volume stored in said data storage means at the time of occurrence of error in moving picture data read out from the recording medium exceeds a data volume equal to n times the data volume transferred from said data storage means during the time the moving picture data of a data volume read out at a time from said recording medium is read out from said recording medium, said retry means is operated; and wherein if the data volume stored in said data storage means at the time of occurrence of error in moving picture data read out from the recording medium is lesser than a data volume equal to n times the data volume transferred from said data storage means during the time the moving picture data of a data volume read out at a time from said recording medium is read out from said recording medium, switching is made to not performing said retry means.

30. A data reproducing method for reproducing compressed data from a recording medium, wherein switching is made between performing and not-performing the retry operation of re-reading from said recording medium error-corrupted moving picture data at the time of error occurrence depending on the state at the time of error occurrence in the moving picture data read out from the recording medium of data storage means transiently storing moving picture data read out from the recording medium, wherein the free space of said data storage means at the time of error occurrence in moving picture data read out from said recording medium is compared to a data volume read out at a time from said recording medium;

if the free space of said data storage means at the time of error occurrence in moving picture data read out from said recording medium is lesser than a data volume read out at a time from said recording medium, said retry means is operated; and wherein if the free space of said data storage means at the time of error occurrence in moving picture data read out from said recording medium exceeds a data volume read out at a time from said recording medium, switching is made to not performing said retry means.

31. A data reproducing method for reproducing compressed data from a recording medium, wherein switching is made between performing and not-performing the retry operation of re-reading from said recording medium error-corrupted moving picture data at the time of error occurrence depending on the state at the time of error occurrence in the moving picture data read out from the recording medium of data storage means transiently storing moving picture data read out from the recording medium, wherein the free space of said data storage means at the time of error occurrence in moving picture data read out from said recording medium is compared to a data volume equal to n times a data volume read out at a time from said recording medium, n being a natural number;

if the free space of said data storage means at the time of error occurrence in moving picture data read out from said recording medium is lesser than a data volume equal to n times a data volume read out at a time from said recording medium, said retry means is operated; and wherein if the free space of said data storage means at the time of error occurrence in moving picture data read out from said recording medium exceeds a data volume equal 1 to n times a data volume read out at a time from said recording, medium switching is made to not performing said retry means.

32. A data reproducing method for reproducing compressed data from a recording medium, wherein switching is made between performing and not-performing the retry operation of re-reading from said recording medium error-corrupted moving picture data at the time of error occurrence depending on the state at the time of error occurrence in the moving picture data read out from the recording medium of data storage means transiently storing moving picture data read out from the recording medium, wherein the free space of said data storage means at the time of occurrence of errors in moving picture data read out from said recording medium is compared to a data volume read out at a time from said recording medium less a data volume transferred from the data storage means during the, time the moving picture data of a data volume read out at a time from said recording medium is read out from the recording medium;

if the free space of said data storage means at the time of occurrence of errors in the moving picture data read out from the recording medium is lesser than the data volume read out at a time from said recording medium less a data volume transferred from the data storage means during the time the moving picture data of a data volume read out at a time from said recording medium is read out from the recording medium, said retry means is operated; and wherein if the free space of said data storage means at the time of occurrence of errors in the moving picture data read out from the recording medium exceeds the data volume read out at a time from said recording medium less a data volume transferred from the data storage means during the time the moving picture data of a data volume read out at a time from said recording medium is read out from the recording medium, switching is made to not operating said retry means.

33. A data reproducing method for reproducing compressed data from a recording medium, wherein switching is made between performing and not-performing the retry operation of re-reading from said recording medium error-corrupted moving picture data at the time of error occurrence depending on the state at the time of error occurrence in the moving picture data read out from the recording medium of data storage means transiently storing moving picture data read out from the recording medium, wherein the free space of said data storage means at the time of occurrence of errors in moving picture data read out from said recording medium is compared to a data volume equal to n times a data volume read out at a time from said recording medium less a data volume transferred from the data storage means during the time the moving picture data of a data volume read out at a time from said recording medium is read out from the recording medium, n being a natural number;

if the free space of said data storage means at the time of occurrence of errors in the moving picture data read out from the recording medium is lesser than a data volume equal to n times the data volume read out at a time from said recording medium less a data volume transferred from the data storage means during the time the moving picture data of a data volume read out at a time from said recording medium is read out from the recording medium, said retry means is operated; and wherein if the free space of said data storage means at the time of occurrence of errors in the moving picture data read out from the recording medium exceeds a data volume equal to n times the data volume read out at a time from said recording medium less a data volume transferred from the data storage means during the time the moving picture data of a data volume read out at a time from said recording medium is read out from the recording medium, switching is made to not operating said retry means.

34. The data reproducing method according to any one of claims 28 to 33, wherein the information indicating occurrence of an error produced in the moving picture data read out from said recording medium is outputted to outside.

35. The data reproducing method according to any one of claims 28 to 33, wherein said moving picture data on said magnetic disc is read out by a magnetic head used as said recording medium.

36. A data reproducing method for reproducing digital data from a recording medium wherein the digital data is discriminated as to whether it is compressed moving picture data or other data; and wherein if said digital data is verified to be compressed moving picture data, switching is made between performing and not performing the retry operation of re-reading from said recording medium error-corrupted moving picture data if an error is produced in moving picture data read out from said recording medium, depending on the state at the time of error occurrence in the moving picture data read out from the recording medium of data storage means transiently storing moving picture data read out from the recording medium.

* * * * *

UNITED STATES PATENT AND TRADEMARK OFFICE
CERTIFICATE OF CORRECTION

PATENT NO. : 6,721,494 B1
DATED : April 13, 2004
INVENTOR(S) : Hiroshi Kanno

It is certified that error appears in the above-identified patent and that said Letters Patent is hereby corrected as shown below:

Column 30,
Line 9, ":a" should read -- a --.

Column 34,
Line 65, "n-equal" should read -- equal --.

Column 36,
Line 6, "1 to" should read -- to --.
Line 24, "the, time" should read -- the time --.

Signed and Sealed this

Twenty-third Day of November, 2004

JON W. DUDAS
*Director of the United States Patent and Trademark Office*